United States Patent [19]

Yamamura

[11] Patent Number: 5,274,286
[45] Date of Patent: Dec. 28, 1993

[54] SPINDLE DEVICE WITH A BUILT-IN MOTOR

[75] Inventor: Motohisa Yamamura, Iwakuni, Japan
[73] Assignee: Teijin Seiki Co., Ltd., Osaka, Japan
[21] Appl. No.: 4,256
[22] Filed: Jan. 14, 1993

[30] Foreign Application Priority Data

Jan. 16, 1992 [JP] Japan ................. 4-5299[U]

[51] Int. Cl.⁵ .............. F16C 32/06; H02K 1/22; H02K 7/08
[52] U.S. Cl. ................. 310/67 R; 310/90; 310/262; 310/266; 384/111
[58] Field of Search ............. 310/90, 52, 53, 58, 310/59, 60 R, 60 A, 62, 63, 261, 262, 266, 265; 384/111, 113, 115, 118, 121; 360/98.07, 99.04, 99.08

[56] References Cited

U.S. PATENT DOCUMENTS

| | | | |
|---|---|---|---|
| 2,830,541 | 4/1958 | Higgins et al. | 384/115 |
| 4,306,166 | 12/1981 | Quandt | 310/90 |
| 4,362,020 | 12/1982 | Meacher | 60/657 |
| 4,869,626 | 9/1989 | Kosmowski | 408/129 |
| 4,919,547 | 4/1990 | Schwartzman | 384/110 |
| 5,127,744 | 7/1992 | White | 384/112 |
| 5,168,186 | 12/1992 | Yashiro | 310/47 |

Primary Examiner—Steven L. Stephan
Assistant Examiner—D. R. Haszko
Attorney, Agent, or Firm—Lane, Aitken & McCann

[57] ABSTRACT

A spindle device with a built-in motor comprises a casing, a working spindle having a large radius portion formed with a bore and a small radius portion extending from the large radius portion, the large radius portion being housed in the casing, and the small radius portion protruding from the casing and having a working tool mounted thereon, a cylindrical motor rotor attached to an inner surface of the large radius portion of the working spindle, a fixed shaft provided in the casing and loosely inserted into the motor rotor, and a motor stator mounted on an outer surface of the fixed shaft opposed to the motor rotor. The casing is formed with an air passageway having a plurality of injection nozzles which are open at an inner surface of the casing opposed to an outer surface of the large radius portion of the working spindle. The working spindle that is rotating is supported by supplying air consecutively from the injection nozzles to a narrow space formed between the inner surface of the casing and the outer surface of the large radius portion of the working spindle.

10 Claims, 5 Drawing Sheets

SPINDLE DEVICE WITH A BUILT-IN MOTOR

FIELD OF THE INVENTION

The present invention relates to a spindle device with a built-in motor wherein the working spindle is operated by the built-in motor.

DESCRIPTION OF THE PRIOR ART

A conventional spindle device with a built-in motor is shown, for example, in Japanese laid-open publication No. 3-3629. The spindle device comprises a motor casing, a spindle having its rear portion housed in the motor casing and its front portion protruded from the motor casing, a stator attached to the inner surface of the motor casing, and a rotor mounted on the outer surface of the spindle opposed to the stator. An end mill is mounted on the front portion of the spindle. The stator and the rotor as a whole constitute a built-in motor for rotating the spindle. An air passageway is formed in the motor casing and the stator, and has an injection nozzle which is open at the inner surface of the stator. In this spindle device, the spindle that is rotating is supported by supplying air consecutively from the injection nozzle to a narrow space formed between the stator and the rotor.

In such a conventional spindle device, there is not provided a member for covering the outer surface of the rotor and such a rotor is generally made from a relatively brittle material. Therefore, if the rotor is rotated at a high speed such as 100,000 rpm., a large tension will occur in the interior of the rotor due to centrifugal forces and cause the outer surface of the rotor to be damaged. In addition, since the diameter of the space between the stator and the rotor is small, an effective area that undergoes an air static pressure (area of the inner surface of the stator and area of the outer surface of the rotor) is narrow and therefore the support of the spindle is reduced in stability.

It is, accordingly, an important object of the present invention to provide a spindle device with a built-in motor wherein the motor can be prevented from being damaged during high-speed rotation and the support of the spindle is enhanced in stability.

SUMMARY OF THE INVENTION

In accordance with an important aspect of the present invention, there is provided a spindle device with a built-in motor, which comprises a casing and a working spindle having a large radius portion formed with a bore and a small radius portion extending from the large radius portion, the large radius portion being housed in the casing, and the small radius portion protruding from the casing and having a working tool mounted thereon. The device further comprises a cylindrical motor rotor attached to an inner surface of the large radius portion of the working spindle, a fixed shaft provided in the casing and loosely inserted into the motor rotor, and a motor stator mounted on an outer surface of the fixed shaft opposed to the motor rotor, the motor stator and the motor rotor as a whole constituting the built-in motor for rotating the working spindle. The casing is formed with an air passageway having a plurality of injection nozzles which are open at an inner surface of the casing opposed to an outer surface of the large radius portion of the working spindle. The working spindle that is rotating is supported by supplying air consecutively from the injection nozzles to a narrow space formed between the inner surface of the casing and the outer surface of the large radius portion of the working spindle.

A rotational drive force is exerted on the working spindle by electromagnetic interaction between the motor rotor and the motor stator, and the working spindle is rotated at high speeds. When the working spindle is rotating at such high speeds, air is introduced into the injection nozzles through the air passageway and injected consecutively into the narrow space between the casing and the large radius portion of the working spindle. As a result, the working spindle that is rotating is supported by a static-pressure bearing formed by the air injected to the space from the injection nozzles. Since the narrow space is positioned radially outwardly of the large radius portion of the working spindle surrounding the motor stator and motor rotor and therefore is greater in diameter than the large radius portion, an effective area that undergoes the static pressure of the air becomes wider and the support of the working spindle by the static-pressure bearing is enhanced in stability. In addition, since the motor rotor is attached to the inner surface of the large radius portion of the working spindle, the large radius portion covers the outer surface of the motor rotor and therefore centrifugal breakage of the motor rotor is prevented. If the large diameter portion of the working spindle covers the outer surface of the motor rotor, a compression force will occur in the interior of the motor rotor due to centrifugal forces. However, since a breakage limit by such a compression force is generally higher than a breakage limit by a tension force, breakage of the motor rotor by the centrifugal forces can be prevented.

The fixed shaft and the motor stator are formed with a second air passageway having a plurality of second injection nozzles which are open at an outer surface of the stator, and the working spindle that is rotating is supported by supplying air consecutively from the second injection nozzles to a narrow space formed between the motor stator and the motor rotor. In this construction, the motor rotor is prevented from contacting with the motor stator. The working spindle is also supported by a static-pressure bearing formed by the air injected from the second injection nozzles, so the support of the working spindle is further enhanced in stability.

The working spindle is provided with a thrust-force receiving member, and a bearing block is formed with a groove into which the thrust-force receiving member is inserted, and the groove is formed with third injection nozzles so that a thrust force exerted on the working spindle is supported by injecting air from the third injection nozzles to the thrust-force receiving member. In this construction, the thrust force exerted on the working spindle that is rotating is supported by the thrust-force receiving member, so that the axial position of the working spindle is maintained substantially constant.

The thrust-force receiving body may extend radially inward from the large radius portion of the working spindle. In this construction, an increase in the diameter of the device can be prevented and a dead space can be used effectively.

The casing may be formed with a fourth injection nozzle opposed to a vertical end face between the large and small radius portions of the working spindle, and the fixed shaft may also have an end face which is formed with a fifth injection nozzle opposed to a bottom surface of the bore formed in the large radius portion of the working spindle. The thrust force exerted on the working spindle is supported by supplying air from the fourth injection nozzle to a space between the casing and the vertical end face of the working spindle and from the fifth injection nozzle to a space between the bottom surface of the bore of the large radius portion and the end face of the fixed shaft.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
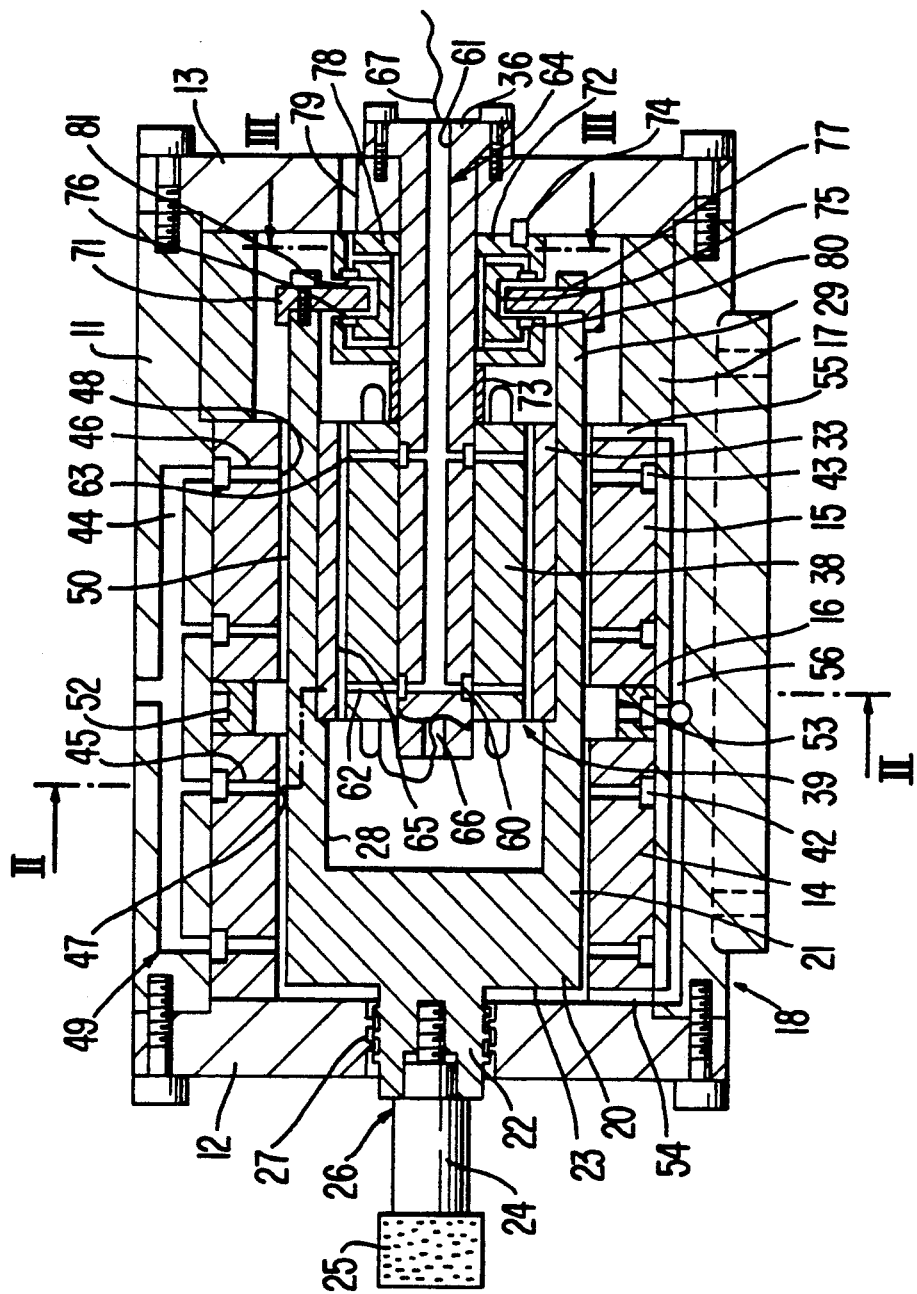
FIG. 1 is a longitudinal sectional view showing an embodiment of a spindle device according to the present invention.
Figure 2:
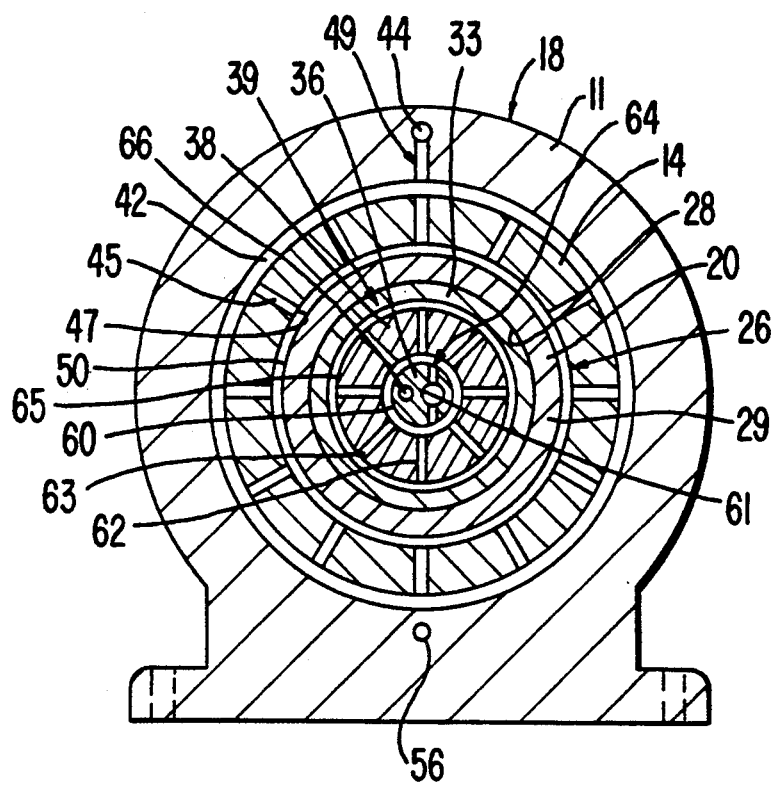
FIG. 2 is a cross sectional view of the device in FIG. 1 taken substantially along line II—II of FIG. 1.

Referring to FIGS. 1 and 2, there is shown an embodiment of the present invention. Reference numeral 11 denotes a generally cylindrical casing main body, which has a front circular cover plate 12 mounted on the front end of the casing main body 11 and a rear circular cover plate 13 mounted on the rear end of the casing main body 11. The casing main body 11 is closed at the front end by the front cover plate 12 and at the rear end by the rear cover plate 13. Ring members 14 and 15 are inserted within the casing main body 11, and a distance piece 16 is interposed between these ring members 14 and 15. The outer surfaces of the ring members 14 and 15 are closely contacted with the inner surface of the casing main body 11. Between the ring member 15 and the rear cover plate 13 there is provided a distance piece 17. The casing main body 11, front cover plate 12, rear cover plate 13, ring members 14, 15 and the distance pieces 16, 17 as a whole constitute a fixed casing 18.

A main shaft 20 is disposed within the fixed casing 18, and has a large radius portion 21 slightly smaller than the inner surfaces of the ring members 14, 15 and a small radius portion 22 extending from the large radius portion 21. Between the large and small radius portions 21 and 22 there is formed a vertical end face 23. A grinding tool (working tool) 24 is screwed into the front end of the small radius portion 22 of the main shaft 20 and has a grindstone 25 mounted thereon. The main shaft 20 and the grinding tool 24 as a whole constitute a working spindle 26. The large radius portion 21 of the working spindle 26 is housed in the fixed casing 18, and the small radius portion 22 of the working spindle 26 extends through a bore formed in the front cover plate 12 and protrudes from the front cover plate 12. Between the front cover plate 12 and the small radius portion 22 of the main shaft 20 there is provided a labyrinth seal 27. The main shaft 20 is formed at the rear end face thereof with a large radius bore 28 extending toward the front end, so that the shaft 20 is formed at the rear end portion with a cylindrical portion 29.

A cylindrical motor rotor 33 is fixed to the inner surface of the cylindrical portion 29 of the main shaft 20 by shrinkage fitting and has a permanent magnet or electromagnet. A fixed shaft 36 is fixed to the rear cover plate 13 of the fixed casing 18 and extends toward the front cover plate 12 and is loosely inserted into the motor rotor 33. At the position opposed to the motor rotor 33, a motor stator 38 is fixed on the fixed shaft 36 by shrinkage fitting. The motor rotor 33 and the motor stator 38 as a whole constitute a built-in motor 39.

The aforementioned ring members 14 and 15 are formed at their outer surface with circumferential grooves 42 and circumferential grooves 43, respectively. These circumferential grooves 42 and 43 are communicated with the radially inner ends of an axially extending passageway 44 formed in the casing main body 11. The radially outer end of the axial passageway 44 is open at the outer surface of the casing main body 11 and connected to a source of air (not shown). The circumferential grooves 42 are communicated with the outer ends of radial bores 45 formed in the ring member 14, respectively. Likewise, the circumferential grooves 43 are communicated with the outer ends of radial bores 46 formed in the ring member 15, respectively. These radial bores 45 and 46 are equidistantly disposed in the axial direction of the ring members 14, 15. The inner ends of the radial bores 45 and 46 are open at the inner surfaces of the ring members 14 and 15 and constitute injection nozzles 47 and 48. The aforementioned circumferential grooves 42, 43, passageway 44, and the radial bores 45, 46 as a whole constitute an air passageway 49. Air introduced in the injection nozzles 47, 48 through this air passageway 49 is injected consecutively and supplied to a narrow annular space 50 defined by the inner surfaces of the ring members 14, 15 and the outer surface of the cylindrical portion 29 of the working spindle 26. The radial distance of the annular space 50, that is, the radial distance between the inner surfaces of the ring members 14, 15 and the outer surface of the cylindrical portion 29 is extremely small (10 to 30 $\mu$m), so that the working spindle 26 that is rotating is supported from the outside by a static-pressure bearing that is formed by the air injected to the annular space 50 from the injection nozzles 47 and 48, without contacting with the ring members 14 and 15. It is noted that the air supplied to the annular space 50 is exhausted to the outside through a circumferential groove 52 formed in the distance piece 16 and through bores 54 and 55 formed in the ring members 14 and 15.

A plurality of circumferential grooves 60 are formed in the outer surface of the fixed shaft 36 opposed to the inner surface of the motor stator 38, and are communicated with an air supply passageway 61 formed in the fixed shaft 36. The air supply passageway 61 is connected with a source of air (not shown). The motor stator 38 is formed with radial bores 62 having radial inner ends respectively communicated with the circumferential grooves 60 formed in the fixed shaft 36. The radial outer ends of the radial bores 62 are open at the outer surface of the stator 38 and constitute injection nozzles 63. The aforementioned circumferential grooves 60, air supply passage 61 and the radial bores 62 as a whole constitute a second air passageway 64. Air introduced in the injection nozzles 63 through this air passageway 64 is injected consecutively and supplied to a narrow annular space 65 defined by the motor stator 38 and the motor rotor 33. The radial distance of the annular space 65, that is, the radial distance between the outer surface of the motor stator 38 and the inner surface of the motor rotor 33 is extremely small (10 to 30 μm), so that the working spindle 26 that is rotating is also supported from the inside by a static-pressure bearing that is formed by the air injected to the annular space 65 from the injection nozzles 63. It is noted that the air supplied to the annular space 65 is exhausted to the outside through an axially extending exhaust passageway 66 formed in the fixed shaft 36. The exhaust passageway 66 is also used as a bore through which a lead wire 67 extends from the motor stator 38 to the outside.

Figure 3:
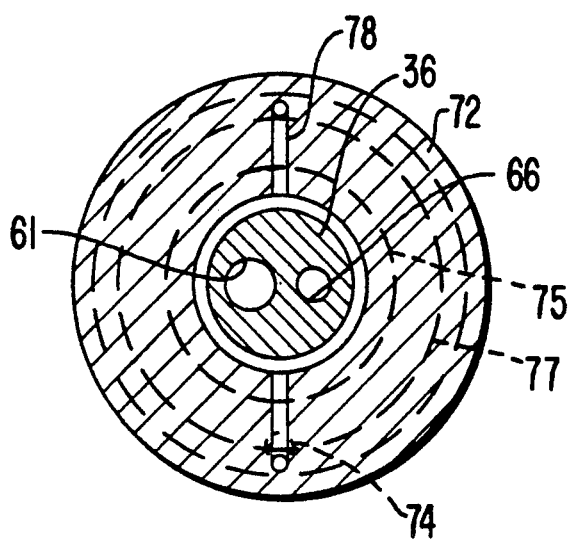
FIG. 3 is a view taken substantially along the line III—III of FIG. 1.

In FIGS. 1, 2 and 3, an annular receiving body 71 is attached to the cylindrical portion 29 of the main shaft 20 and protrudes radially inward from the cylindrical portion 29. If the receiving body 71 is protruded radially inward, the outside diameter of the device can be reduced in comparison with the case that receiving body 71 is protruded radially outward. In addition, a dead space can be utiliized effectively. A cylindrical bearing block 72 is inserted on the fixed shaft 36 between the motor stator 38 and the rear cover plate 13. Between the bearing block 72 and the motor stator 38 there is provided a distance piece 73 for urging the bearing block 72 against the rear cover plate 13. A positioning pin 74 is inserted into the bearing block 72 and the rear cover plate 13 so that the bearing block 72 can be prevented from rotating with respect to the rear cover plate 13. The bearing block 72 is formed at the outer surface thereof with a circumferential groove 75 into which the radially inner end portion of the receiving body 71 is inserted. The circumferential groove 75 is formed at the vertical walls thereof with a first annular injection nozzle 76 opposed to one face of the radially inner end portion of the receiving body 71 and a second annular injection nozzle 77 opposed to the other face of the radially inner end portion of the receiving body 71. Air is supplied to these injection nozzles 76 and 77 through an air passageway 78 formed in the bearing block 72, and the air passageway 78 is connected with a source of air (not shown) through a bore 79 formed in the rear cover plate 13. If the air introduced into the injection nozzles 76 and 77 is injected toward the axially inner and outer end faces of the radially inner end portion of the receiving body 71, a thrust force transmitted from the working spindle 26 to the receiving body 71 is supported by a thrust bearing formed by the air injected from the injection nozzles 76 and 77, without contacting the receiving body 71 with the bearing block 72. Since the air injected from the injection nozzles 76 and 77 is continuously supplied to narrow spaces 80 and 81 defined by the circumferential groove 75 and the receiving body 71 and since the axial distances of the spaces 80 and 81 are very small, the aforementioned thrust force is strongly supported.

The operation of the aforementioned embodiment of the present invention will hereinafter be described.

It is now assumed that a rotational drive force is exerted on the working spindle 26 by electromagnetic interaction between the motor rotor 33 and the motor stator 38 and that the working spindle 26 is rotating at high speeds. The grindstone 25 of the grinding tool 24 is brought into contact with a workpiece, and a predetermined grinding operation is performed with respect to the workpiece. When the working spindle 26 is rotating at such high speeds, air is introduced into the injection nozzles 47 and 48 through the air passageway 49 and injected consecutively into the narrow space 50 between the ring members 14, 15 and the cylindrical portion 29 of the working spindle 26. As a result, the working spindle 26 that is rotating is supported in non-contact relationship from the outside by the static-pressure bearing formed by the air injected to the space 50 from the injection nozzles 47 and 48. Since the narrow space 50 is positioned radially outwardly of the cylindrical portion 29 surrounding the motor stator 38 and motor rotor 33 and therefore is greater in diameter than the cylindrical portion 29, an effective area that undergoes the static pressure of the air becomes wider and the support of the working spindle 26 by the static-pressure bearing is enhanced in stability. In addition, since the motor rotor 33 is attached to the inner surface of the cylindrical portion 29 of the working spindle 26, the cylindrical portion 29 covers the outer surface of the motor rotor 33 and therefore centrifugal breakage of the motor rotor 33 is prevented. If the cylindrical portion 29 covers the outer surface of the motor rotor 33, a compression force will occur in the interior of the motor rotor 33 due to centrifugal forces. However, since a breakage limit by such a compression force is generally higher than a breakage limit by a tension force, breakage of the motor rotor 33 by the centrifugal forces can be prevented. In addition, when the working spindle 26 is rotating at high speeds, air is also injected from the injection nozzles 63 into the narrow space 65 between the motor stator 38 and the motor rotor 33. As a result, the working spindle 26 that is rotating is also supported in non-contact relationship from the inside by the static-pressure bearing formed by the air injected to the space 65 from injection nozzles 63, and the support of the working spindle 26 is further enhanced in stability.

In addition, if, as described above, a workpiece is grounded by the grinding tool 24, a thrust force is exerted on the working spindle 26. However, since such a thrust force is supported by the air thrust bearing formed by the air injected from the injection nozzles 76 and 77, the axial position of the working spindle 26 is maintained substantially constant during the grinding operation. In addition, since the air injected from the injection nozzles 76 and 77 is continuously supplied to the narrow spaces 80 and 81, the aforementioned thrust force is more strongly supported. Such an air thrust bearing can undergo a larger thrust force easily, as compared with an electromagnetic bearing, and a stability of control can be enhanced. In addition, control installation costs can be reduced in comparison with an electromagnetic bearing in which an electromagnetic control device is expensive.

Figure 4:
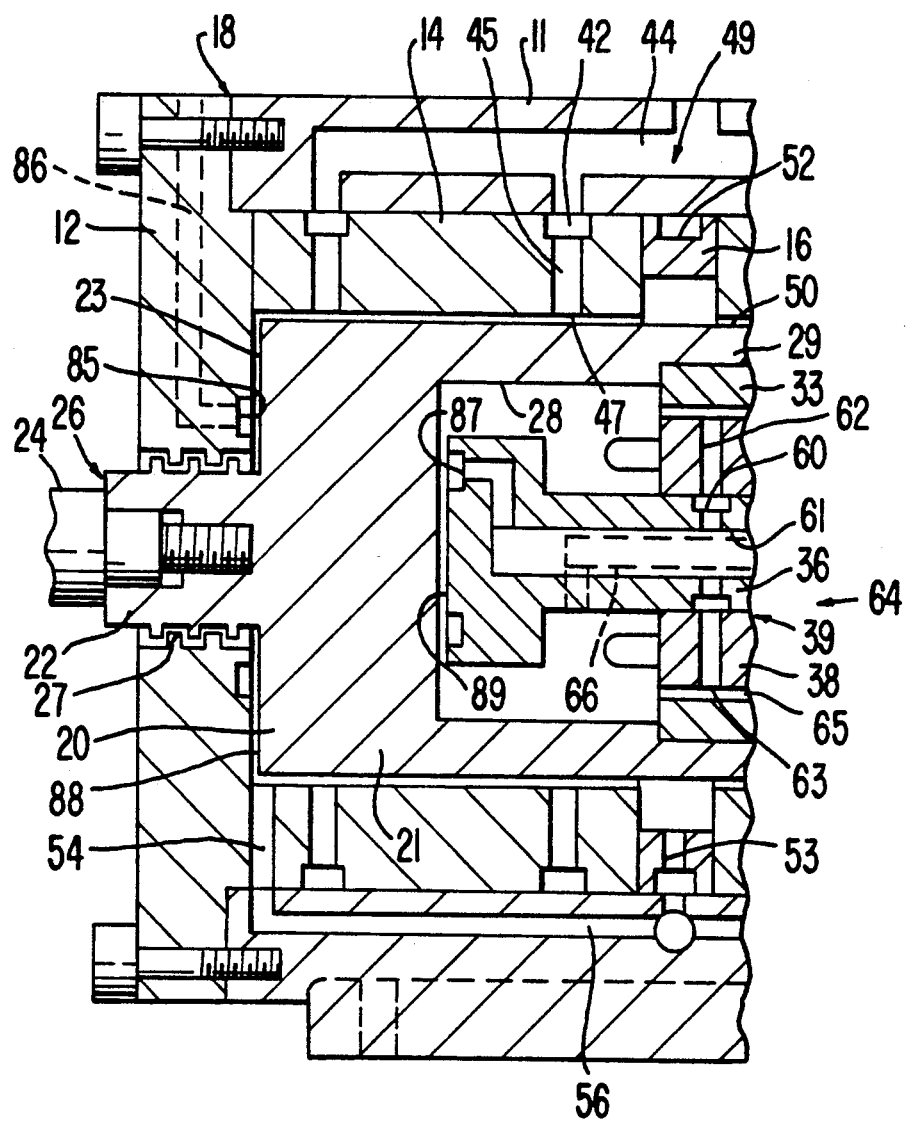
FIG. 4 is a fragmentary section showing a second embodiment of the spindle device according to the present invention.
Figure 5:
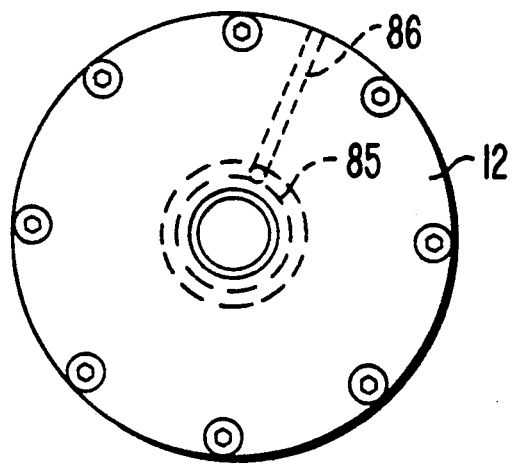
FIG. 5 is an end view showing the front cover plate of the second embodiment of FIG. 4.
Figure 6:
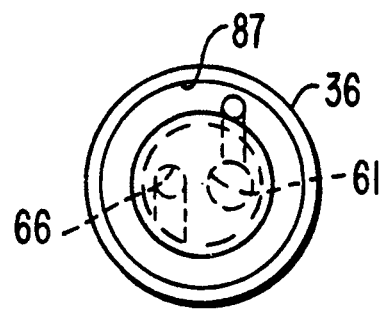
FIG. 6 is an end view showing the fixed shaft of the second embodiment of FIG. 4.

Referring to FIGS. 4-6, there is shown a second embodiment of the present invention. In this embodiment, the receiving plate 71 and bearing block 72 of the first embodiment are omitted and a thrust bearing is provided in the vicinity of a front cover plate 12. That is, the front cover plate 12 is formed with an annular injection nozzle 85 opposed to a vertical end face 23 of a working spindle 26, and air is introduced into the injection nozzle 85 through a passageway 86 formed in the front cover plate 12. In addition, a fixed shaft 36 extends to the vicinity of the bottom surface of a large radius bore 28, as shown in FIG. 4, and the shaft 36 is formed at its front end with an annular injection nozzle 87 to which air is supplied through an air supply passageway 61. Therefore, if air is injected from the injection nozzle 85 to the vertical end face 23 of the working spindle 26 and from the injection nozzle 87 to the bottom surface of the large radius bore 28 of the working spindle 26, a thrust force exerted on the working spindle 26 will be supported by an air thrust bearing formed by the injected air. In this embodiment, an increase in the outer diameter of the device can be prevented, a dead space can be used effectively, and a thrust bearing by air can be provided. Like the first embodiment, a space 88 between the front cover plate 12 and the vertical end face 23 of the working spindle 26 and a space 89 between the bottom surface of the cylindrical portion 29 and the end face of the fixed shaft 36 are very small, so the thrust force exerted on the working spindle 26 can be strongly supported.

Figure 7:
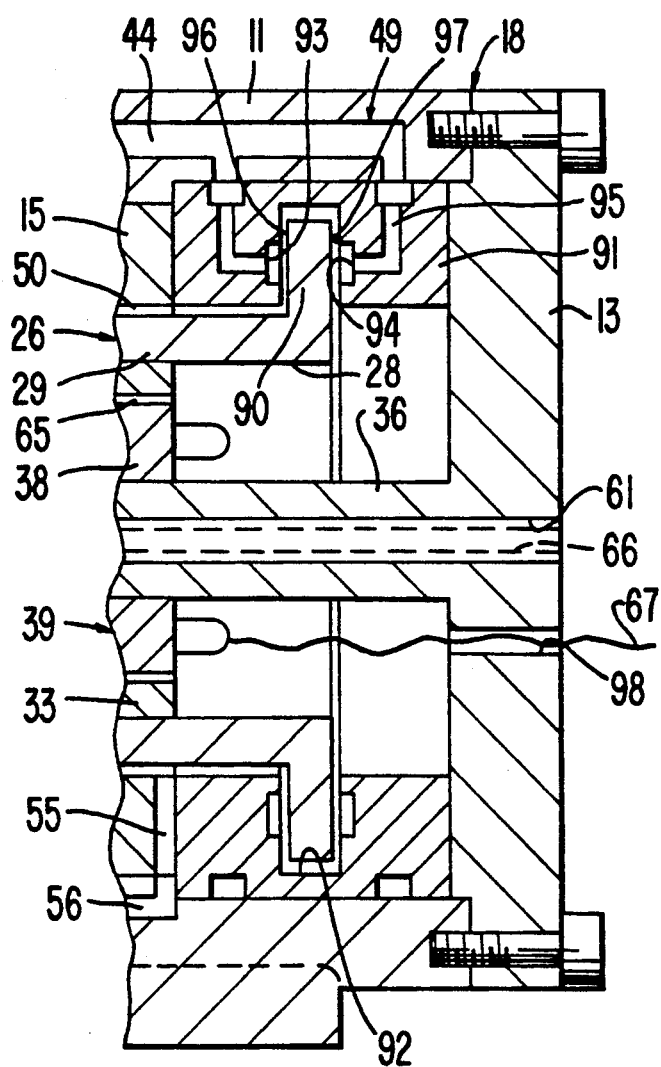
FIG. 7 is a fragmentary section showing a third embodiment of the spindle device according to the present invention.

FIG. 7 shows a third embodiment of the invention. In this embodiment, unlike the first embodiment, an annular receiving body 90 is formed integrally with the cylindrical portion 29 of the working spindle 26, and the receiving body 90 extends radially outward from the cylindrical portion 29. In addition, a bearing block 91 is fixed to the inner surface of the casing main body 11 and formed with a circumferential groove 92 into which the radially outer end portion of the receiving body 90 is inserted. The circumferential groove 92 is formed at the opposite vertical walls thereof with annular injection nozzles 93 and 94. Air is introduced into the injection nozzles 93 and 94 through an axial passageway 44 formed in the casing main body 11 and through a passageway 95 formed in the bearing block 91. Therefore, if the air introduced into the injection nozzles 93 and 94 is injected toward the receiving body 91, the thrust force exerted on the working spindle 26 will be supported by a thrust bearing formed by the injected air. As described above, if spaces 96 and 96 between the bearing block 91 and the receiving body 90 is made very narrow, then the thrust force exerted on the working spindle 26 will be more strongly supported. The third embodiment of the present invention is also characterized in that the fixed shaft 36 is formed integrally with the rear cover plate 13 and a lead wire 67 extend from the motor stator 38 to the outside through a through bore 98 formed in the rear cover plate 13.

While in the aforementioned embodiments each of the injection nozzles 76, 77, 85, 87, 93 and 94 is constituted by an annular groove, it is noted that it may also be constituted by eight or more circular bores. In addition, an orifice or choke may be provided in each of the air passageways in the vicinities of the injection nozzles 47, 48, 63, 76, 77, 85, 87, 93 and 94.

While the subjection invention has been described with relation to the preferred embodiments, various modifications and adaptations thereof will now be apparent to those skilled in the art. All such modifications and adaptations as fall within the scope of the appended claims are intended to be covered thereby.

What I claim is:

1. A spindle device with a built-in motor, comprising:
   a casing;
   a working spindle having a large radius portion formed with a bore and a small radius portion extending from said large radius portion, the large radius portion being housed in said casing, and the small radius portion protruding from said casing and having a working tool mounted thereon;
   a cylindrical motor rotor attached to an inner surface of said large radius portion of said working spindle;
   a fixed shaft provided in said casing and loosely inserted into said motor rotor; and
   a motor stator mounted on an outer surface of said fixed shaft opposed to said motor rotor, said motor stator and said motor rotor as a whole constituting said built-in motor for rotating said working spindle;
   said casing being formed with an air passageway having a plurality of injection nozzles which are open at an inner surface of said casing opposed to an outer surface of said large radius portion of said working spindle;
   said working spindle that is rotating being supported by supplying air consecutively from said injection nozzles to a narrow space formed between said inner surface of said casing and said outer surface of said large radius portion of said working spindle.

2. A device as set forth in claim 1, wherein said fixed shaft and said motor stator are formed with a second air passageway having a plurality of second injection nozzles which are open at an outer surface of said stator, and said working spindle that is rotating is supported by supplying air consecutively from said second injection nozzles to a narrow space formed between said motor stator and said motor rotor.

3. A device as set forth in claim 1, wherein said working spindle is provided with a thrust-force receiving member, and a bearing block is formed with a groove into which said thrust-force receiving member is inserted, and said groove is formed with third injection nozzles so that a thrust force exerted on said working spindle is supported by injecting air from said third injection nozzles to said thrust-force receiving member.

4. A device as set forth in claim 2, wherein said working spindle is provided with a thrust-force receiving member, and a bearing block is formed with a groove into which said thrust-force receiving member is inserted, and said groove is formed with third injection nozzles so that a thrust force exerted on said working spindle is supported by injecting air from said third injection nozzles to said thrust-force receiving member.

5. A device as set forth in claim 3, wherein said thrust-force receiving body extends radially inward from said large radius portion of said working spindle.

6. A device as set forth in claim 3, wherein said thrust-force receiving body extends radially outward from said large radius portion of said working spindle.

7. A device as set forth in claim 4, wherein said thrust-force receiving body extends radially inward from said large radius portion of said working spindle.

8. A device as set forth in claim 4, wherein said thrust-force receiving body extends radially outward from said large radius portion of said working spindle.

9. A device as set forth in claim 1, wherein said casing is formed with a fourth injection nozzle opposed to a vertical end face between said large and small radius portions of said working spindle, and said fixed shaft has an end face which is formed with a fifth injection nozzle opposed to a bottom surface of said bore formed in said large radius portion of said working spindle, a thrust force exerted on said working spindle being supported by supplying air from said fourth injection nozzle to a space between said casing and said vertical end face of said working spindle and from said fifth injection nozzle to a space between said bottom surface of said bore of said large radius portion and said end face of said fixed shaft.

10. A device as set forth in claim 2, wherein said casing is formed with a fourth injection nozzle opposed to a vertical end face between said large and small radius portions of said working spindle, and said fixed shaft has an end face which is formed with a fifth injection nozzle opposed to a bottom surface of said bore formed in said large radius portion of said working spindle, a thrust force exerted on said working spindle being supported by supplying air from said fourth injection nozzle to a space between said casing and said vertical end face of said working spindle and from said fifth injection nozzle to a space between said bottom surface of said bore of said large radius portion and said end face of said fixed shaft.

* * * * *